United States Patent
Ishizaki et al.

(10) Patent No.: US 7,693,980 B2
(45) Date of Patent: *Apr. 6, 2010

(54) INTEGRATED SERVICE MANAGEMENT SYSTEM

(75) Inventors: Takeshi Ishizaki, Sunnyvale, CA (US); Shigeru Miyake, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 323 days.

This patent is subject to a terminal disclaimer.

(21) Appl. No.: 11/923,587

(22) Filed: Oct. 24, 2007

(65) Prior Publication Data

US 2008/0043764 A1    Feb. 21, 2008

Related U.S. Application Data (63) Continuation of application No. 09/964,129, filed on Sep. 25, 2001, now Pat. No. 7,379,987, which is a continuation-in-part of application No. 09/841,710, filed on Apr. 24, 2001, now Pat. No. 7,099,912.

(51) Int. Cl.
    *G06F 15/173* (2006.01)
(52) U.S. Cl. .................. 709/223; 709/229; 709/238
(58) Field of Classification Search .............. 709/223, 709/229, 238
    See application file for complete search history.

(56) References Cited

U.S. PATENT DOCUMENTS

| | | | |
|---|---|---|---|
| 5,768,271 A | 6/1998 | Seid et al. | |
| 5,881,227 A | 3/1999 | Brenner et al. | |
| 6,073,172 A | 6/2000 | Frailong et al. | |
| 6,079,020 A | 6/2000 | Liu | |
| 6,112,085 A | 8/2000 | Garner et al. | |
| 6,148,337 A | 11/2000 | Estberg et al. | |
| 6,173,399 B1 | 1/2001 | Gilbrech | |
| 6,175,917 B1 | 1/2001 | Arrow et al. | |
| 6,178,505 B1 | 1/2001 | Schneider et al. | |
| 6,192,454 B1 | 2/2001 | De Vos | |
| 6,205,488 B1 | 3/2001 | Casey et al. | |
| 6,295,575 B1 | 9/2001 | Blumenau et al. | |

(Continued)

FOREIGN PATENT DOCUMENTS

EP    1052810 A2    11/2000

(Continued)

OTHER PUBLICATIONS

Philip J. Chea, "Office Action," Nov. 8, 2005, 15 pages, U.S. Appl. No. 09/956,635, filed Sep. 20, 2001, U.S. Patent Office, United States.

(Continued)

*Primary Examiner*—Tonia L Dollinger
*Assistant Examiner*—Kyung H Shin
(74) *Attorney, Agent, or Firm*—Sughrue Mion, PLLC (57) ABSTRACT

The present invention provides techniques for creation, operation, management, and access control of network-based storage services. Specific embodiments provide improved efficiency of the service management tasks used for designing, operating and accounting the robust and profitable network services, for example. In representative embodiments, techniques for constructing integrated network and storage services are provided. In a specific embodiment, the service comprises of three major service components: virtual private networks (VPN), application servers and storage area networks (SAN). Each of these service components has its own customer identification information, such as VPN identifier for VPN services, process identifier for application servers and logical unit number (LUN) for storage devices.

10 Claims, 8 Drawing Sheets

U.S. PATENT DOCUMENTS

| | | | |
|---|---|---|---|
| 6,421,711 | B1 | 7/2002 | Blumenau et al. |
| 6,487,547 | B1 | 11/2002 | Ellison et al. |
| 6,526,056 | B1 | 2/2003 | Rekhter et al. |
| 6,567,848 | B1 | 5/2003 | Kusuda et al. |
| 6,577,642 | B1 | 6/2003 | Fijolek et al. |
| 6,584,507 | B1 | 6/2003 | Bradley et al. |
| 6,597,956 | B1 | 7/2003 | Aziz et al. |
| 6,609,153 | B1 | 8/2003 | Salkewicz |
| 6,640,278 | B1 | 10/2003 | Nolan et al. |
| 6,658,417 | B1 | 12/2003 | Stakutis et al. |
| 6,662,221 | B1 | 12/2003 | Gonda et al. |
| 6,665,714 | B1 | 12/2003 | Blumenau et al. |
| 6,674,756 | B1 | 1/2004 | Rao et al. |
| 6,765,591 | B2 | 7/2004 | Poisson et al. |
| 7,085,827 | B2 | 8/2006 | Ishizaki et al. |
| 2001/0050914 | A1 | 12/2001 | Akahane et al. |
| 2002/0019864 | A1 | 2/2002 | Mayer |
| 2002/0056008 | A1 | 5/2002 | Keane et al. |
| 2002/0069272 | A1 | 6/2002 | Kim et al. |
| 2002/0069274 | A1 | 6/2002 | Tindal et al. |
| 2002/0156828 | A1 | 10/2002 | Ishizaki et al. |
| 2002/0156867 | A1 | 10/2002 | Iwami |
| 2002/0158828 | A1 | 10/2002 | Isami et al. |
| 2003/0097370 | A1 | 5/2003 | Yamamoto |
| 2003/0237016 | A1 | 12/2003 | Johnson et al. |

FOREIGN PATENT DOCUMENTS

| | | |
|---|---|---|
| JP | 8137810 | 5/1996 |
| WO | WO 0114987 A2 | 1/2001 |

OTHER PUBLICATIONS

Kyung H. Shin, "Office Action," Aug. 24, 2005, 20 pages, U.S. Appl. No. 09/964,129, filed Sep. 25, 2001, U.S. Patent Office, United States.

Kyung H. Shin, "Office Action," Jan. 14, 2005, 18 pages, U.S. Appl. No. 09/964,129, filed Sep. 25, 2001, U.S. Patent Office, United States.

Philip J. Chea, Office Action Summary, May 5, 2005, 11 pages, U.S. Appl. No. 09/956,635, filed Sep. 20, 2001, U.S. Patent Office, United States.

Philip J. Chea, Office Action Stumnary, Dec. 21, 2004, 5 pages, U.S. Appl. No. 09/956,635, filed Sep. 20, 2001, U.S. Patent Office, United States.

Do-Hyeon Kim, et al., "Design and implementation of network management systems for integrated management of LANS and WANS", International Journal of Network Management. May-Jun. 2000, pp. 135-143, vol. 10, issue 3. John Wiley & Sons, Ltd.

Michael A. Bauer, et al., "An Integrated Distributed Systems Management Architecture", IBM Centre for Advanced Studies Conference—Proceedings of the 1993 conference of the Centre for Advanced Studies on Collaborative research: software engineering—vol. 1. 1993, pp. 27-40, vol. 1. IBM Centre for Advances Studies Conference, Toronto, Canada.

Garth A. Gibson, et al., "Network Attached Storage Architecture—In our increasingly Internet-dependent business and computing environment, network storage is the computer", Communications of the ACM. Nov. 2000, pp. 37-45, vol. 43, No. 11.

Web Page: "Virtual Private Networks On Vendor Independent Networks", IBM Technical Disclosure Bulletin, Dated Sep. 1992. Printed: Apr. 20, 2001, pp. 326-329. URL:http://www.delphion.com/tdbs/tdb?&order=92A+62488.

Schneider, J.M., T. Preub, and P.S. Nielsen, "Management of Virtual Private Networks for Integrated Broadband Communication", Conference Proceedings on Communications Architectures, Protocol and Applications, 1993, pp. 224-237.

E. Rosen, et al., "BGP/MPLS VPNs", Informational Internet Memo dated Mar. 1999, RFC 2547, 22 pages. URL: http://www.ietf.org/rfc/rfc2547.txt?number=2547.

Jeffrey C. Pwu, "Office Action," Nov. 3, 2005, 4 pages, U.S. Appl. No. 09/841,710, filed Apr. 24, 2001, U.S. Patent Office, United States.

Jeffrey C. Pwu, Advisory Action, Aug. 1, 2005, 2 pages, U.S. Appl. No. 09/841,710, filed Apr. 24, 2001, U.S. Patent Office, United States.

Thomas J. Mauro, Jr., Office Action, Mar. 14, 2005, 18 pages, U.S. Appl. No. 09/841,710, filed Apr. 24, 2001, U.S. Patent Office, United States.

Thomas J. Mauro, Jr., Office Action, Aug. 23, 2004, 22 pages, U.S. Appl. No. 09/841,710, filed Apr. 24, 2001, U.S. Patent Office, United States.

Philip J. Chea, "Office Action," May 5, 2005, 11 pages, U.S. Appl. No. 09/956,635, filed Sep. 20, 2001, U.S. Patent Office, United States.

Philip J.. Chea, "Office Action," Dec. 21, 2004, 5 pages, U.S. Appl. No. 09/958,635, filed Sep. 20, 2001, U.S. Patent Office, United States.

E. Rosen, et al. "BGP/MPLS VPNs", Informational Internet Memo dated Mar. 1999, RFC 2547, 22 pages URL: http://www.ietf.org/rfc/rfc2547.txt?number=2547.

FIG. 1
SYSTEM CONFIGURATION

FIG. 2
VPN MANAGEMENT SYSTEM

FIG. 3
INTEGRATED SERVICE MANAGEMENT SYSTEM (ISMS)

FIG. 4
SERVICE CONFIGURATION TABLE

| Subsystem name | Address |
|---|---|
| VPN subsystem | 192.168.1.11 |
| Server subsystem | 192.168.1.12 |
| Storage subsystem | 192.168.1.13 |

*400*

FIG. 5
VPN TABLE

| VPN ID | Site | Address 1 | Address 2 | Protocol | Internet | VLAN ID |
|---|---|---|---|---|---|---|
| VR-A | Aa | IP(Aa) | IP(VR-A) | PP2P | YES | VID-A |
| | Ab | IP(Ab) | IP(VR-A) | PP2P | YES | |
| VR-B | Ba | IP(Ba) | IP(VR-B) | IPsec | YES | VID-B |
| | Bb | IP(Bb) | IP(VR-B) | IPsec | No | |
| VR-C | Ca | IP(Ca) | IP(VR-C) | L2TP | No | VID-C |
| | Cb | IP(Cb) | IP(VR-C) | L2TP | No | |
| VR-D | Da | IP(Da) | IP(VR-D) | IPsec | YES | VID-D |
| | Db | IP(Db) | IP(VR-D) | IPsec | YES | |

*500*

FIG. 6
SERVER TABLE

| SERVER | Address | VLAN ID | Application | OS | CPU |
|---|---|---|---|---|---|
| S-Aa | IP(S-Aa) | VID-A | WWW | OS-1 | 1GHz |
| S-Ab | IP(S-Ab) | | Email | OS-1 | 1GHz |
| S-B | IP(S-B) | VID-B | WWW/Email | OS-2 | 866MHz |
| S-CD | IP(S-CD) | VID-CD | Email/Calendar | OS-3 | 750MHz |

*600*

| Volume | Port | Server allowed | Capacity | Access |
|---|---|---|---|---|
| V-Aa | P(V-Aa) | S-Aa, S-Ab | 100GB | Read only |
| V-Ab | P(V-Ab) | S-Aa, S-Ab | 100GB | Read only |
| V-B | P(V-B) | S-B | 50GB | Read only |
| V-CDa | P(V-CDa) | S-CD | 30GB | Read/Write |
| V-CDb | P(V-CDb) | S-CD | 30GB | Read only |

FIG. 7
STORAGE TABLE

| Customer | VPN | Server | Volume |
|---|---|---|---|
| Customer A | VR-A | S-Aa, S-Ab | V-Aa, V-Ab |
| Customer B | VR-B | S-B | V-B |
| Customer C | VR-C | S-CD | V-CDa, V-CDb |
| Customer D | VR-D | S-CD | V-CDa, V-CDb |

FIG. 8
SERVICE MAPPING TABLE

| Customer | VPN | Server | Volume |
|---|---|---|---|
| Customer A | Normal | Normal | Normal |
| Customer B | Normal | Normal | Normal |
| Customer C | Normal | Normal | Fault |
| Customer D | Normal | Normal | Normal |

FIG. 9
SERVICE STATUS TABLE

FIG. 14
SYSTEM CONFIGURATION WITH LPAR

FIG. 15
LPAR AND HBA

| Server | Address | Physical Server | VLAN ID | LPAR ID | HBA ID | Application | OS | CPU |
|--------|---------|-----------------|---------|---------|--------|-------------|-----|-----|
| S-Aa | IP(S-Aa) | P-1 | VID-A | L-1 | H-1 | WWW | OS-1 | 1GHz |
|       |          |     |       |     | H-2 |     |      |       |
| S-Ab | IP(S-Ab) |     |       | L-2 | H-3 | Email | OS-1 | 1GHz |
| S-B  | IP(S-B)  |     | VID-B | L-3 | H-4 | WWW/Email | OS-2 | 866MHz |
| S-CD | IP(S-CD) | P-2 | VID-CD | L-1 | H-5 | Email/Calendar | OS-3 | 750MHz |
|      |          |     |       |     |     | Email/Calendar | OS-1 | 750MHz |

FIG. 16
SERVER TABLE WITH LPAR

| Volume | Port | HBA allowed | Capacity | Access |
|--------|------|-------------|----------|--------|
| V-Aa | P(V-Aa) | H-1, H-2, H-3 | 100GB | Read only |
| V-Ab | P(V-Ab) | H-1, H-2, H-3 | 100GB | Read only |
| V-B | P(V-B) | H-4 | 50GB | Read only |
| V-CDa | P(V-CDa) | H-5 | 30GB | Read/Write |
| V-CDb | P(V-CDb) | H-5 | 30GB | Read only |

FIG. 17
STORAGE TABLE WITH HBA IDENTIFICATION

INTEGRATED SERVICE MANAGEMENT SYSTEM

CROSS REFERENCE TO RELATED APPLICATIONS

This application is a Continuation of U.S. application Ser. No. 09/964,129 filed Sep. 25, 2001 now U.S. Pat. No. 7,379,987; which is a continuation-in-part of U.S. application Ser. No. 09/841,710, by common inventors TAKESHI ISHIZAKI and SHIGERU MIYAKE, filed Apr. 24, 2001 now U.S. Pat. No. 7,099,912, and entitled "INTEGRATED SERVICE MANAGEMENT SYSTEM", application Ser. Nos. 09/964,129 and 09/841,710 fully incorporated herein by reference for all purposes.

BACKGROUND OF THE INVENTION

The present invention relates generally to techniques for managing storage, and in particular to techniques for creation, operation, management, and access control of network-based storage services.

Conventional network-based value-added services comprises of more than one service components. For example, outsourcing service of enterprise application over Internet involves network access services via the Internet, hosting service of Web servers and database servers and storage management services. Each service component may be provided by different service providers or may be served by one consolidated service provider. While certain advantages to such conventional approaches are perceived, opportunities for further improvement exist. For example, according to conventional network management technology, managing such complicated service systems, to keep the service up and running, can be a challenging task to the service operators.

What is needed are improved techniques for creation, operation, management, and access control of network-based storage services.

SUMMARY OF THE INVENTION

The present invention provides techniques for creation, operation, management, and access control of network-based storage services. Specific embodiments provide improved efficiency of the service management tasks used for designing, operating and accounting the robust and profitable network services, for example. In representative embodiments, techniques for constructing integrated network and storage services are provided. In a specific embodiment, the service comprises of three major service components: virtual private networks (VPN), application servers and storage area networks (SAN). Each of these service components has its own customer identification information, such as VPN identifier for VPN services, process identifier for application servers and logical unit number (LUN) for storage devices.

In some specific embodiments, service customers are connected to the service provider through VPN. The VPN path that connects customer sites and the data center of the service provider are terminated on a VPN termination device or a VPN router. Within the VPN router, multiple routing processing programs or virtual routers (VR) run independently. The VPN router is connected to the application servers via virtual LAN (VLAN) switch. These application servers are then connected to the service provider's SAN.

The integrated service management system collects management information from individual management systems corresponding to each service components (VPN, servers and SAN) and holds mappings or relationship information between resources in each service component and the customer who is allowed to use those resources. For example, VPN management system is responsible for mapping between VPN customer and VPN path used by that customer. Similarly, server management systems assign a number of servers to a certain customer. Integrated service management systems collect this kind of mapping information between customers and resources within service components. An application programming interface (API), enables software developers to implement management applications using the functionality of the integrated service management systems.

In a representative embodiment according to the present invention, a system is provided. The system comprises a connection to a virtual private network, and a router, which is connected to the virtual private network. The router maintains at least one virtual router for a client. The system further comprises at least one server, and a virtual LAN switch, which is connected to the router. The server can be apportioned into one or more logical partitions. The virtual LAN switch provides selectable forwarding for information from the router to at least one logical partition of the server. The system also includes at least one volume and an FC switch. The FC switch provides selectable interconnection between the at least one logical partitions of the server and the at least one volume, so that information received from a plurality of sources via the virtual private network is directed to a particular virtual router for each of the sources by the router. In some specific embodiments, a virtual private network management system controls operation of the router. The information is then directed to a particular one of the logical partitions of the server for each of the sources by the virtual LAN switch. In some specific embodiments, a server management system controls operation of the virtual LAN switch. The information is then directed to a particular volume for each of the sources by the FC switch. In some specific embodiments, a storage management system controls operation of the FC switch.

In a representative specific embodiment, in which a virtual private network management system is used to control the router, the virtual private network management system comprises a network interface module, that receives commands from an integrated service management system, a service order processing module, that analyzes and executes the commands, updates a table of virtual private network information, and sends new configuration information to the router through a control module. In some specific embodiments, the virtual service management system further comprises a virtual private network table. The virtual private network table has a VPN ID that identifies a specific VPN, an Address 1 and an Address 2 that hold IP addresses of two end points of the specific VPN, a Protocol that specifies a VPN protocol that is used on the specific VPN, an Internet that indicates whether access to public Internet is permitted, and a VLAN ID that is assigned to packets received over the specific VPN.

In another representative embodiment, an integrated service management system is used to control operation of other management systems. In a specific embodiment, the integrated service management system comprises a network interface module that receives requests to change configuration, a service order processing module that analyzes and executes requests to change configuration received by the network interface module, updates related table cache in a service management database, and sends new configuration information using the network interface module. In some specific embodiments, the integrated service management system further comprises a service configuration table that stores destination information. In select embodiments, the integrated service management system further comprises a server table that stores a server table, said server table having a server identification, an address, a physical server identifier, a virtual LAN identification, a logical partition (LPAR) identification, a host bus adaptor (HBA) identification, an application identification, an operating system identifier, and a CPU information, for example. In some specific embodiments, the integrated service management system further comprises a storage table that stores storage table having a volume identifier, a port identifier, an allowed host bus adapter(s) (HBAs) identifier, a capacity identifier, and an access information. The integrated service management system further comprises a service mapping table that stores a customer identifier, a virtual private network identifier, a server identifier, and a volume identifier in some specific embodiments. In some embodiments, the integrated service management system further comprises a service status table that stores a customer identifier, a virtual private network status, a server status, and a volume status.

In some specific embodiments, an operator console application sends a request command to change service configuration to the integrated management system. In select specific embodiments, a customer portal application sends a request command to change service configuration to the integrated management system.

In another representative embodiment, a method for managing storage is provided. The method comprises receiving a request to change a configuration of an integrated storage and networking system; analyzing the request to determine a new configuration; updating configuration tables to reflect the new configuration; and sending new configuration information to at least one of a plurality of subsystem managers. The configuration tables may comprise a mapping between a logical partition and at least one of a plurality of HBAs attached thereto, for example.

In another representative embodiment, a method for managing a configuration for a virtual private network is provided. The method comprises receiving at a subsystem manager a request to change to a new configuration for a virtual private network of an integrated storage and networking system; analyzing the request to determine a new configuration for the virtual private network of the integrated storage and networking system; updating configuration tables to reflect the new configuration; and sending commands to a virtual private network router to implement the new configuration. The configuration tables may comprise a mapping between a logical partition and at least one of a plurality of HBAs attached thereto, for example.

In another representative embodiment, a method for managing a configuration for at least one of a plurality of servers is provided. The method comprises receiving at a subsystem manager a request to change to a new configuration for at least one of a plurality of servers in an integrated storage and networking system; analyzing the request to determine a new configuration for the at least one of a plurality of servers in the integrated storage and networking system; updating configuration tables to reflect the new configuration; and sending commands to a virtual LAN switch to implement the new configuration. The configuration tables may comprise a mapping between a logical partition and at least one of a plurality of HBAs attached thereto, for example.

In another representative embodiment, a method for managing a configuration for at least one of a plurality of storage devices is provided. The method comprises receiving at a subsystem manager a request to change to a new configuration for at least one of a plurality of storage devices of an integrated storage and networking system; analyzing the request to determine a new configuration for the at least one of a plurality of storage devices of the integrated storage and networking system; updating configuration tables to reflect the new configuration; and sending commands to a fibre channel switch to implement the new configuration. The configuration tables may comprise a mapping between a logical partition and at least one of a plurality of HBAs attached thereto, for example.

In another representative embodiment, an apparatus is provided. The apparatus comprises a connection to a virtual private network; a router that is connected to the virtual private network. The router maintains at least one virtual router for a client and at least one server. The server can be apportioned into one or more logical partitions. The apparatus further includes a virtual LAN switch, connected to the router. The virtual LAN switch provides selectable forwarding for information from the router to at least one logical partition of the server. The apparatus also includes at least one volume and an FC switch. The FC switch provides selectable interconnection between the at least one logical partitions of the server and the at least one volume, so that information received from a plurality of sources via the virtual private network is directed to a particular virtual router for each of the sources by the router. In some specific embodiments, a virtual private network management system controls operation of the router. The information is then directed to a particular one of the logical partitions of the server for each of the sources by the virtual LAN switch. In some specific embodiments, a server management system controls operation of the virtual LAN switch. The information is then directed to a particular volume for each of the sources by the FC switch. In some specific embodiments, a storage management system controls operation of the FC switch.

Numerous benefits are achieved by way of the present invention over conventional techniques. Specific embodiments according to the present invention provide the capability to integrate and manage customer identification information for each of the service components as a whole by the integrated service management systems. This enables the service operator to configure, monitor and manage the service on per-customer or per-service basis. By selecting a certain customer, the operator can focus on the end-to-end service from the customer site to access network, to application servers and storage devices pertaining to the selected customer.

As customer identification information for each of the service components is automatically mapped by the integrated service management systems, in specific embodiments, it is not necessary for the operator of the service provider to manually configure each service component.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 14 shows a representative system configuration using LPAR capability in a specific embodiment of the present invention.

DESCRIPTION OF THE SPECIFIC EMBODIMENTS

The present invention provides techniques for creation, operation and management of network-based storage services. Specific embodiments provide improved efficiency of the service management tasks used for designing, operating and accounting the robust and profitable network services, for example. In representative embodiments, techniques for constructing integrated network and storage services are provided. In a specific embodiment, the service comprises of three major service components: virtual private networks (VPN), application servers and storage area networks (SAN). Each of these service components has its own customer identification information, such as VPN identifier for VPN services, process identifier for application servers and logical unit number (LUN) for storage devices.

In a U.S. Pat. No. 6,205,488, entitled "Internet protocol virtual private network realization using multi-protocol label switching tunnels," which is incorporated by reference herein in it entirety for all purposes, one method for constructing VPN over a packet-based network using multi-protocol label switching (MPLS) technology is described. There are also several techniques to build a virtual private network over public IP networks. For example, IPsec, point-to-point tunneling protocol (PPTP), and layer 2 tunneling protocol (L2TP) may be used to set up a tunneling path between customer-owned network equipment, such as VPN routers and firewalls. Other forms of VPN are a network-based VPN. An example of this type of VPN is described in RFC2547, "BGP/MPLS VPNs," which is incorporated by reference herein in its entirety for all purposes.

However, a need still exists to support integration and mapping between VPN and application services. Further, other service components have their own service management systems. For example, storage area network (SAN) can be managed using SAN management software.

According to the present invention, a plurality of services is used to combine virtual private network (VPN) services, application services and storage access services. This service is referred to as "Secure storage access service" (SSAS) in this document.

Figure 1:
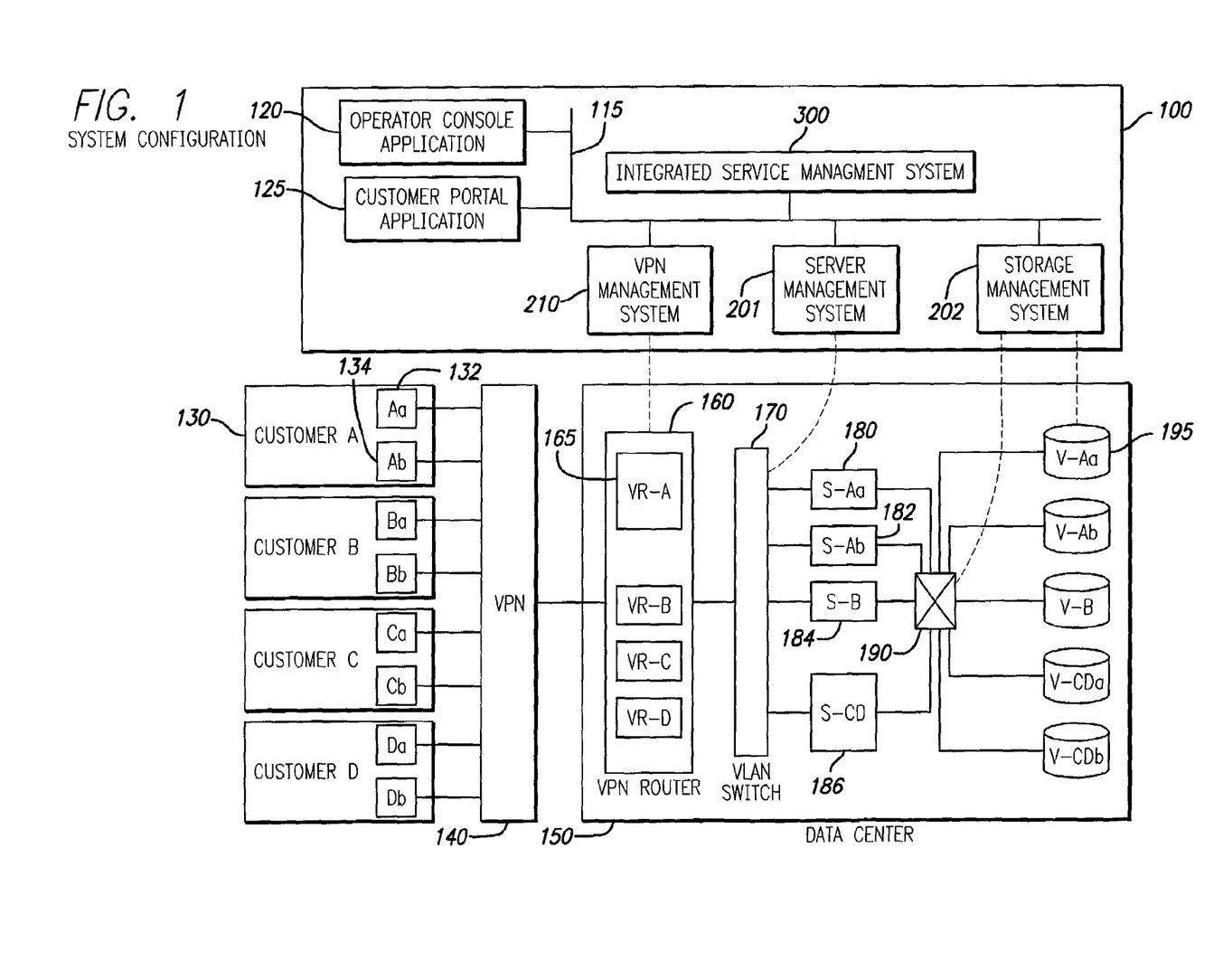
FIG. 1 shows the system overview of SSAS in a specific embodiment of the present invention.

FIG. 1 shows the system overview of SSAS in a specific embodiment of the present invention. Although SSAS may be comprised of one or more service components, in a specific embodiment the SASS comprises of three service components, each of which is described below.

Virtual private network (VPN) service provides secure network path between the customer site and the data center of the service provider over the shared public network such as the Internet. Traffic that goes through VPN path may or may not be encrypted to prevent eavesdropping in various specific embodiments. Each of the VPN service customers has one or more sites to be connected to the VPN. For example, in FIG. 1, Customer A 130 has two sites Aa 132 and Ab 134. Each VPN site is an end point of a VPN path. The other end point of the VPN path is on the VPN router 160, which resides in the data center 150 of the service provider.

The VPN router 160 in the data center 150 aggregate multiple VPN paths, identify the customer by VPN ID, and direct the traffic received from the customer to the virtual LAN (VLAN) switch 170. Within the VPN router 160, there are multiple virtual router (VR) programs, each serving the different VPN customers. For example, in FIG. 1, the VPN paths from service customer A 130 are terminated at the virtual router A 165 in the VPN router 160. Similarly, the VPN paths from customer B are connected to the VR B. Because each VR has its own routing table and other network resources dedicated to the customer it serves, packets from each VPN customer are clearly separated from the network point of view. This enables, for example, two different customers to use the same overlapping IP address spaces within a private address range.

When a VR A 165 receives packets from one of VPN path of customer A 130, it then adds to them the VLAN tag for customer A and sends them to the VLAN switch. The VLAN tag is the information added to the LAN frame so that more than two logically independent networks can be overlaid on the same LAN segment. The more detailed specification of VLAN tag is defined in the IEEE 803.1q standard. The VPN service is one of the service components or subsystems that comprise SSAS and is managed by the VPN management system 210, which will be described herein below.

Application service comprises of one or more application servers ("Servers"). Each service customer is assigned to one or more Servers. For a larger service customer who requires a lot of server processing capacity such as CPU time, more than one server can be assigned for load balancing. On the other hand, for a smaller customer who doesn't use much CPU and wants to reduce the service cost, one application server can be shared among more than one service customers. In the latter case, more than one application processes may be run on the shared application server.

In FIG. 1, customer A uses two servers S-Aa 180 and S-Ab 182 while customers C and D share one server S-CD 186.

Each application server belongs to a certain VLAN. As VLAN switch 170 on the VLAN segment is configured to transfer VLAN-tagged packets from VPN router 160 to an appropriate server connected to the VLAN segment, it is not necessary for servers to know to which VLAN they belong.

Each application server has one or more host bus adapters (HBA) that connect the server to a storage area network (SAN). From the SAN point of view, each server is identified by its HBA address or port. In the configuration illustrated by FIG. 1, each server is connected to a fibre channel (FC) switch 190, which performs the switching functions of the SAN. Application service is one of the service components or subsystems that comprise SSAS and is managed by the server management system 211, which will be described herein below.

Storage service comprises of multiple storage devices or volumes. Each storage volume is configured to accept accesses from a specific application server. Application servers and storage volumes are connected via the storage area network (SAN). In FIG. 1, FC switch 190, of the SAN, is used to connect servers and volumes. In order to segregate servers and volumes for different service customers, the FC switch 190 and/or storage volumes are configured so that access to a specific storage volume is restricted to one or more specific servers. When incorporated into FC switches, this functionality is called "port zoning." When incorporated into storage devices, this functionality is often called "LUN security," where LUN stands for logical unit number.

In FIG. 1, server S-Aa 180 and S-Ab 182 can access volume V-Aa and V-Ab. Server S-B 184 uses volume V-B. Server S-CD 186 gains access to volumes V-CDa and V-CDb. The FC switch 190 is configured to manage the storage access as described above. Storage service is one of the service components or subsystems that comprise SSAS and is managed by the storage management system 212, which will be described herein below.

Integrated service management system (ISMS) 300 is the management server and programs running on it. Integrated service management system (ISMS) 300 communicates with the subsystem management system (SMS) that controls and manages each service component comprising the SSAS. The ISMS 300 includes application programming interfaces that can be used to develop application programs such as an operator console program. Service provider operators can communicate with ISMS 300 by using operator console application 120. Service customers can communicate with ISMS 300 by using customer portal applications 125. The ISMS communicates with other management components such as SMS and applications through management network 115.

Figure 2:
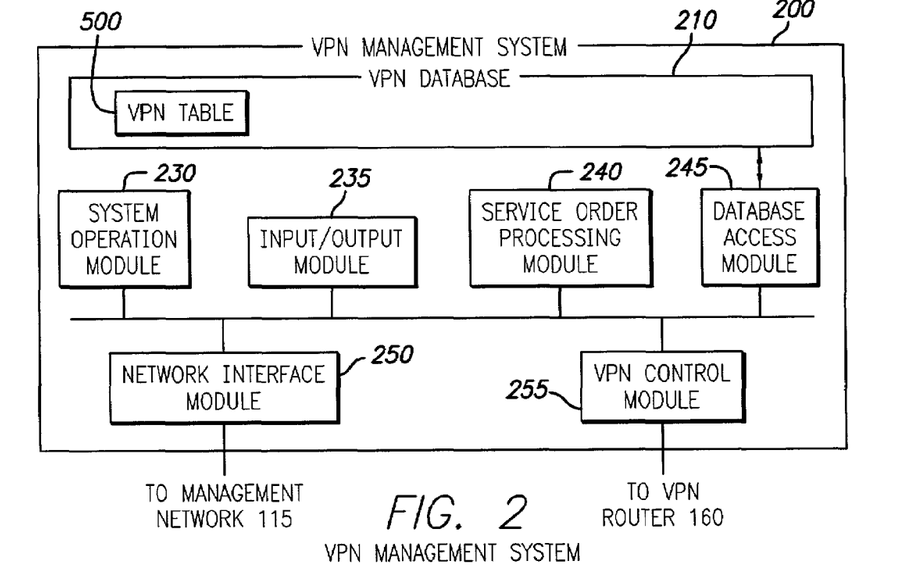
FIG. 2 shows the VPN management system as an example of subsystem management system in a specific embodiment of the present invention.

FIG. 2 shows the VPN management system as an example of a subsystem management system in a specific embodiment of the present invention. Other subsystem management systems, such as server management system 201 and storage management system 202, for example, may be similar to the VPN management system (VPN SMS). The VPN SMS 200 has a network interface module 250 that is connected to the management network 115 and used to send or receive command packet to or from the ISMS 300. The VPN SMS 200 also has a VPN control module 255 that is connected to the VPN router 160 and used to communicate with the VPN router 160 to configure the device.

The information for mapping between VPN path and VLAN tags associated with the VPN path is stored in a VPN table 500 in a VPN database 210. The contents of the VPN table 500 will be described later with reference to FIG. 5. System operation module 230 controls the starting up and shutting down of the VPN SMS 200, and executes common tasks including operating system tasks. Input/output module 350 processes the input/output events of the VPN SMS 200.

Service order processing module 240 is responsible for processing service orders received by network interface module 250. When ISMS 300 sends a request command or a service order to VPN SMS 200 in order to change VPN configuration, the command packet is received by the network interface module 250 of VPN SMS 200. Then, the service order processing module 240 analyzes and executes the command request, updates the VPN table 500 and sends the new configuration information to the VPN router 160 through the VPN control module 255. A database access module 245 is used to read data from or write data into VPN database 210 as requested by other modules of VPN SMS 200.

Figure 3:
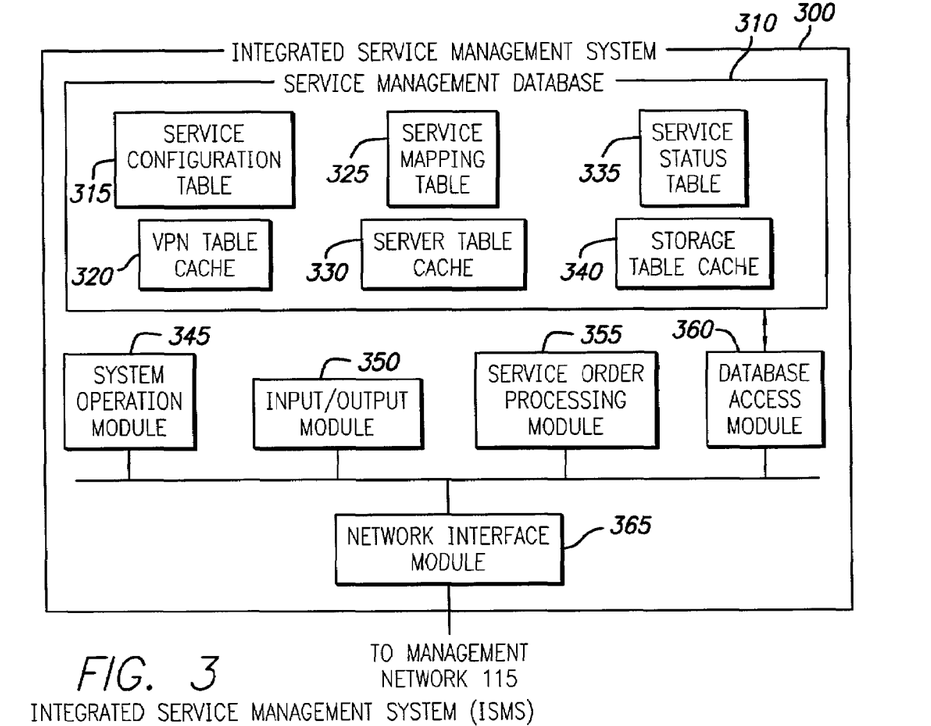
FIG. 3 shows the Integrated Service Management System (ISMS) in a specific embodiment of the present invention.

FIG. 3 shows the Integrated Service Management System (ISMS) in a specific embodiment of the present invention. The ISMS 300 has a network interface module 365 that is connected to the management network 115 and used to send or receive command packets to or from SMSs, such as VPN management system 200, for example. Input/output module 350 processes the input/output events of the ISMS 300.

A service order processing module 355 is responsible for processing service orders received by network interface module 365. When operator console application 120 or customer portal application 125 sends a request command or a service order to ISMS 300 in order to change service configuration, the command packet is received by the network interface module 365 of ISMS 300. Then, the service order processing module 355 analyzes and executes the command request, updates related table caches in service management database 310 and sends the new configuration information to the related SMSs through the network interface module 365.

A database access module 360 is used to read data from or write data into the service management database 310 as requested by other modules of the ISMS 300. Stored within the service management database 310 are a number of tables, which ISMS 300 uses to control and manage the SSAS. Service configuration table 315, service mapping table 325, and service status table 335 are described below.

The ISMS 300 comprises a VPN table cache 320, server table cache 330 and storage table cache 340, which are copies of the corresponding tables managed by SMSs respectively. For example, VPN table cache 320 is a copy of a VPN table 500 that is stored in VPN SMS 200 and collected by ISMS 300. The contents of VPN table, server table and storage table are described below.

Figure 4:
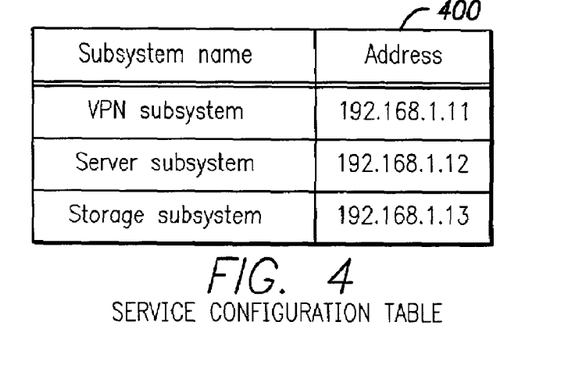
FIG. 4 shows the service configuration table in a specific embodiment of the present invention.

FIG. 4 shows the service configuration table in a specific embodiment of the present invention. Service configuration table 400 contains the configuration information that ISMS 300 uses to identify SMSs to communicate with. In a specific embodiment, ISMS 300 communicates with three subsystems: VPN subsystem, server subsystem, and storage subsystem. The operator of the service system enters the SMS IP address of each subsystem in the service configuration table 400. When starting up, ISMS 300 looks up the service configuration table 400 to establish communication connections to each SMS.

Figure 5:
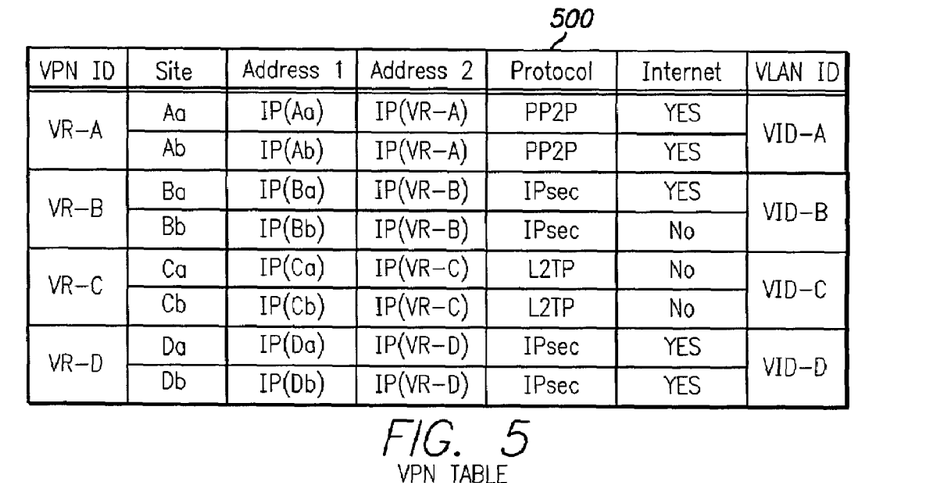
FIG. 5 shows the VPN table 500 that resides in the VPN database 210 of VPN SMS 200 in a specific embodiment of the present invention.

FIG. 5 shows the VPN table 500 that resides in the VPN database 210 of VPN SMS 200 in a specific embodiment of the present invention. The information contained in VPN table 500 is collected and stored by ISMS 300. The VPN table 500 contains the configuration information that VPN subsystem uses to configure the VPN router 160. Within the VPN table 500, "VPN ID" identifies to which VPN the site belongs. "Address 1" and "Address 2" hold the IP addresses of the two end points of the VPN path or tunnel, respectively. "Protocol"

specifies which VPN protocol is used on the VPN path for this site. "Internet" is a Boolean value that indicates whether or not the site is allowed to access public Internet, possibly through a firewall. "VLAN ID" is the VLAN tag value assigned to the packets received from this site over the VPN path.

Figure 6:
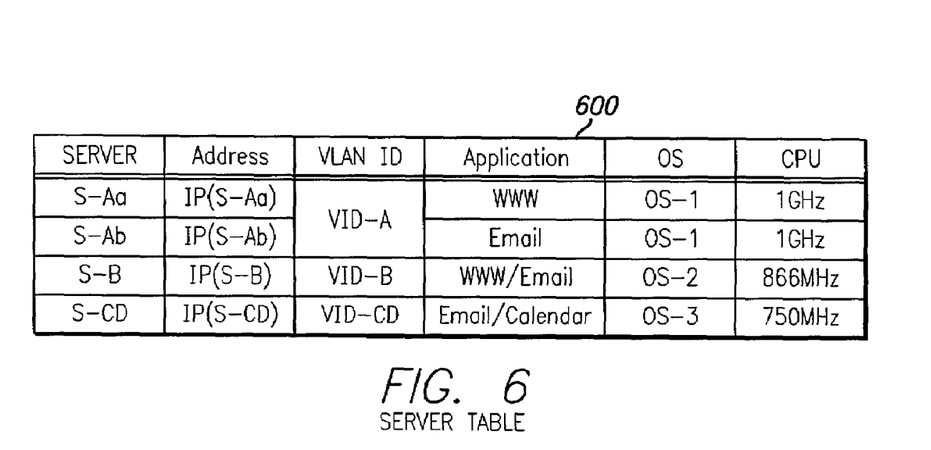
FIG. 6 shows the server table 600 that resides in the server database of server SMS in a specific embodiment of the present invention.

FIG. 6 shows the server table 600 that resides in the server database of server SMS in a specific embodiment of the present invention. The server SMS 201 is similar to VPN SMS 200 in a specific embodiment. The information contained in server table 600 is collected and stored by ISMS 300 as well. Server table 600 contains the configuration information that the server subsystem uses to configure the VLAN switch 170. Within server table 600, "Server" identifies one of application servers within the server subsystem. "Address" holds the IP address of that server. "VLAN ID" is the VLAN tag value assigned to that server. "Application," "OS," and "CPU" indicate the application running on the server, operating systems of the server, and CPU processing capability such as CPU speed, respectively.

Figure 7:
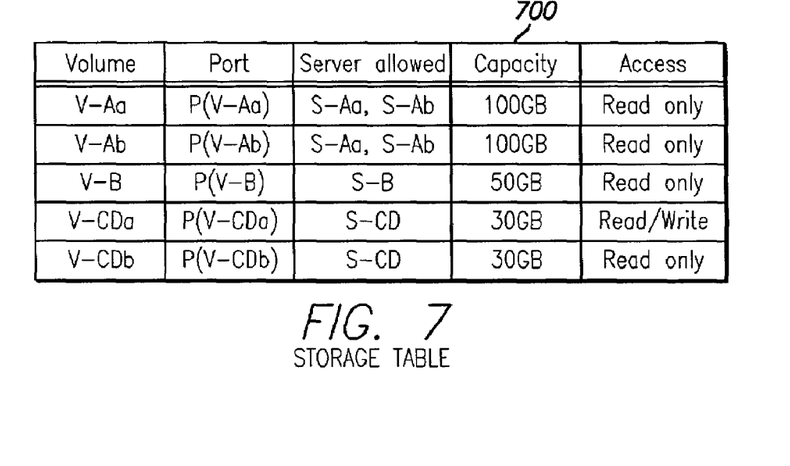
FIG. 7 shows the storage table that resides in the storage database of storage SMS in a specific embodiment of the present invention.

FIG. 7 shows the storage table that resides in the storage database of storage SMS in a specific embodiment of the present invention. The storage SMS 202 is similar to VPN SMS 200 in a specific embodiment. The information contained in storage table 700 is collected and stored by ISMS 300. This table contains the configuration information that the storage subsystem uses to configure the FC switch 190 and storage volumes. "Volume" identifies one of the storage volumes within the storage subsystem. "Port" holds the FC port address of the volume. "Server allowed" specifies those servers that are allowed to access this storage volume. "Capacity" and "Access" indicate the storage volume capacity and access control attribute of the volume, respectively.

Figure 8:
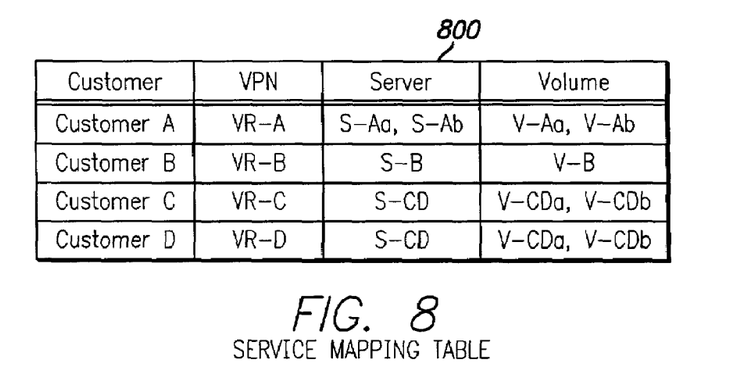
FIG. 8 shows the service mapping table that resides in the service management database 310 in the ISMS 300 in a specific embodiment of the present invention.

FIG. 8 shows the service mapping table that resides in the service management database 310 in the ISMS 300 in a specific embodiment of the present invention. ISMS 300 constructs a single service management table from multiple tables collected from the SMSs that are connected to it. This table defines the mapping between service customer and resources in each subsystem. For example, customer A is mapped to VPN with VPN ID "VR-A," servers "S-Aa" and "S-Ab" and volume "V-Aa" and "V-Ab." When ISMS 300 configures the VPN settings for customer A, ISMS 300 looks up this table, determines VPN ID corresponding to customer A and then issues a command packet to VPN SMS 200 with the VPN ID.

In this way, ISMS 300 can accept the configuration command on a per-customer basis and translate it into the command request to the subsystems with subsystem specific identification information.

Figure 9:
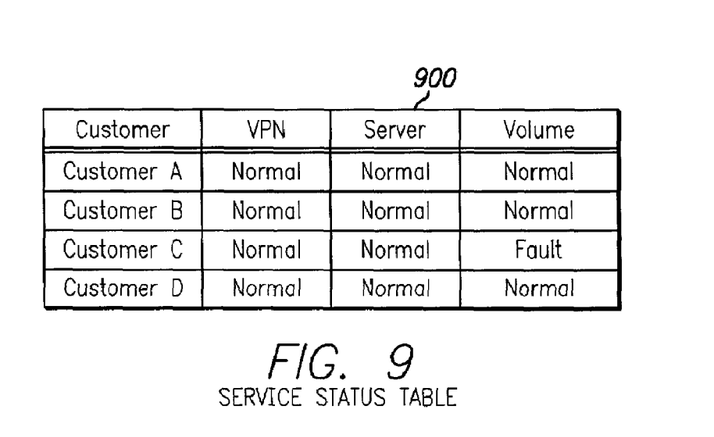
FIG. 9 shows the service status table that resides in the service management database 310 in the ISMS 300 in a specific embodiment of the present invention.

FIG. 9 shows the service status table that resides in the service management database 310 in the ISMS 300 in a specific embodiment of the present invention. When ISMS 300 receives the fault notification from one of SMSs connected to it, it looks up the service mapping table 800 of FIG. 8 and determines which customer is affected by the fault. For example, if the fault of storage volume V-B is received, by consulting the service mapping table 800, ISMS 300 determines that the fault affect the customer B. In this case, ISMS 300 update the service status table 900 by changing the Volume column of the customer B from "Normal" to "Fault." In this way, ISMS 300 can correlate the fault notifications from subsystems to the customer who is affected by the event.

Figure 10:
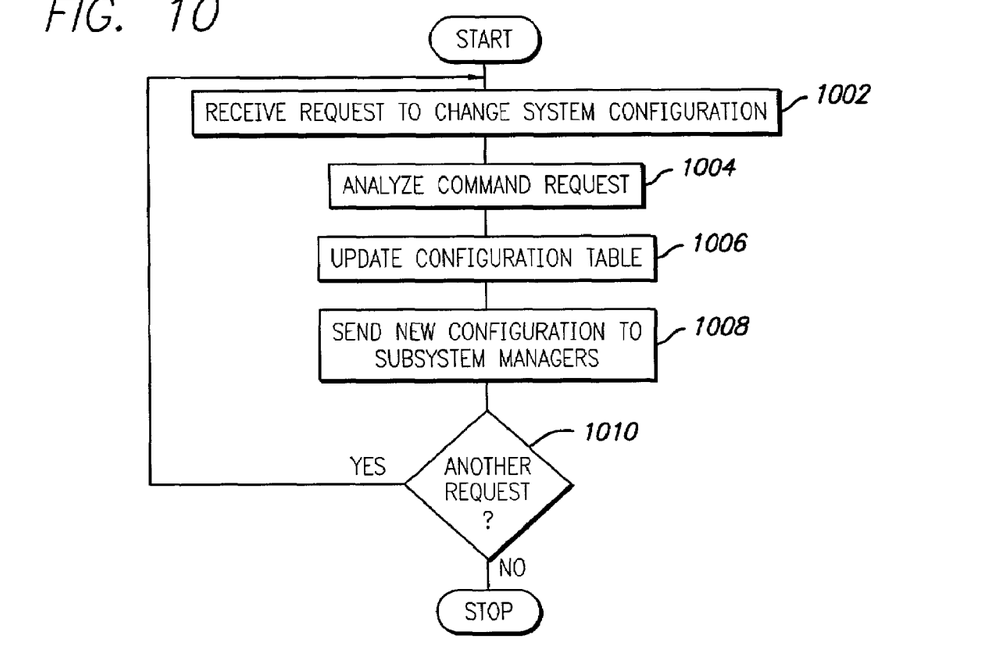
FIG. 10 shows a flowchart of representative integrated service management system processing in a specific embodiment of the present invention.

FIG. 10 shows a flowchart of representative integrated service management system processing in a specific embodiment of the present invention. As illustrated in FIG. 10, in a step 1002, a service order is received by the integrated service system 300. The service order can be created using an operator console application 120 or the customer portal application 125 to send a request command or a service order to the ISMS 300. Service orders can be used to change service configuration and the like, for example. The service order can be in the form of a command packet, which is received by the network interface module 365 of ISMS 300, for example. Then, in a step 1004, the command request is analyzed and executed. In a specific embodiment, service order processing module 355 analyzes the service order to determine the changes that need to be made to the subsystem configurations in order to implement the commands in the service order. Next, in a step 1006, the related table caches in the service management database 310 of the ISMS 300 are updated to reflect the new configuration. Then, in a step 1008, the new configuration information is sent out to the related SMSs through the network interface module 365, for example.

Figure 11:
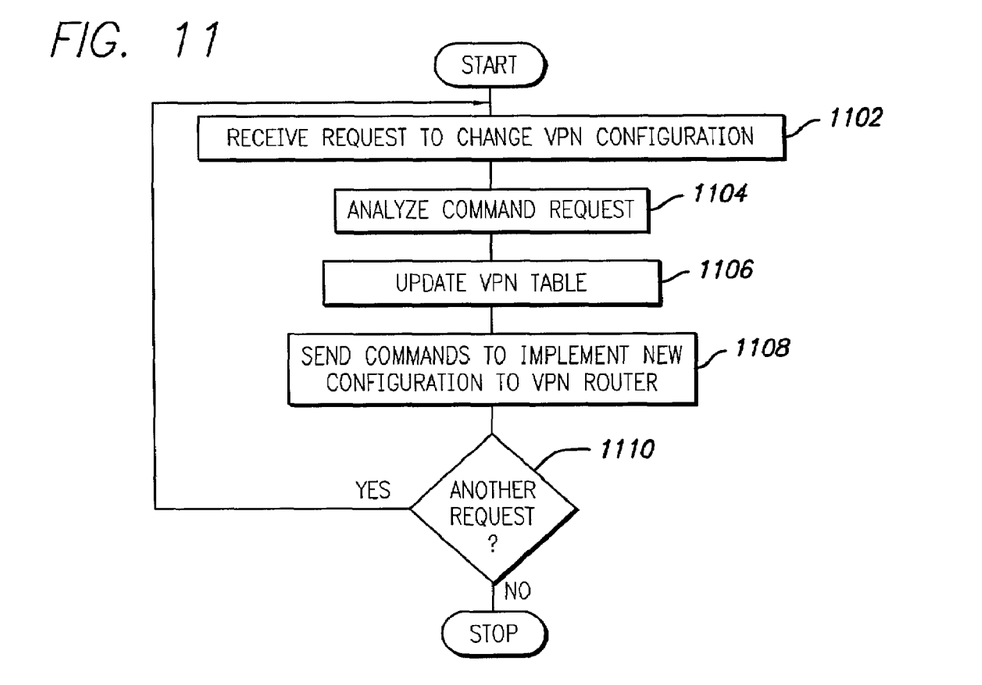
FIG. 11 shows a flowchart of representative virtual private network service management system processing in a specific embodiment of the present invention.

FIG. 11 shows a flowchart of representative virtual private network service management system processing in a specific embodiment of the present invention. As illustrated in FIG. 11, in a step 1102, a service order is received by the virtual private network management system 200. The service order is created by the ISMS 300 in order to implement a change in configuration responsive to receiving a service order from the operator console application 120 or the customer portal application 125, for example. The service order can be in the form of a command packet, which is received by the network interface module 250 of VPN SMS 200, for example. Then, in a step 1104, the service order is analyzed and executed. In a specific embodiment, service order processing module 240 analyzes the service order to determine the changes that need to be made to the VPN subsystem configuration in order to implement the commands within the service order. Next, in a step 1106, the VPN table 500 in the VPN database 210 of the VPN SMS 200 is updated to reflect the new configuration. Then, in a step 1108, instructions to implement the new configuration are sent out to the VPN router 160 through the VPN control module 255, for example.

Figure 12:
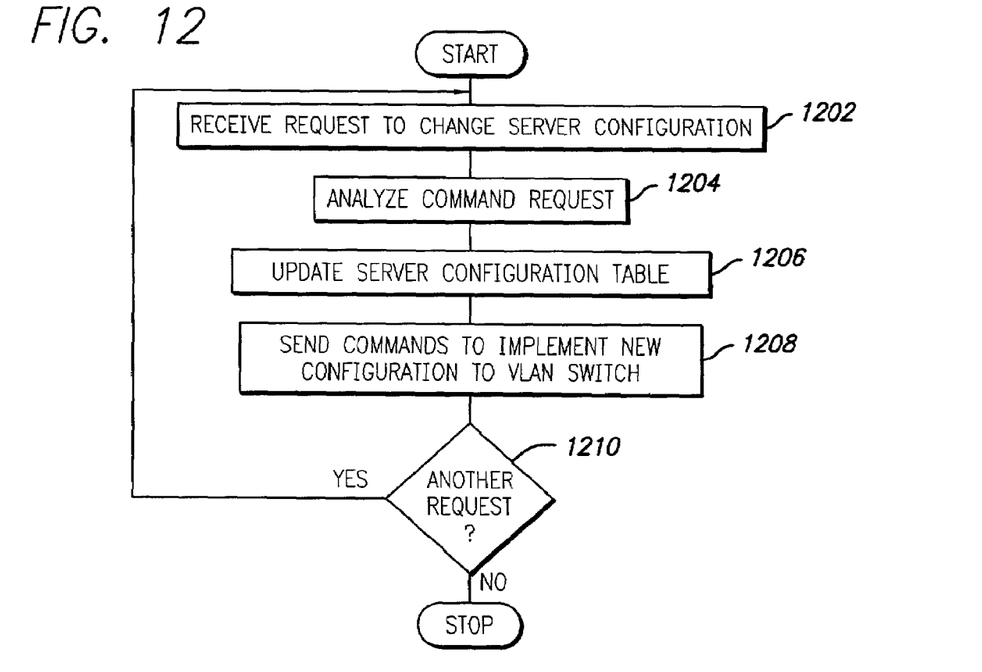
FIG. 12 shows a flowchart of representative server management system processing in a specific embodiment of the present invention.

FIG. 12 shows a flowchart of representative server management system processing in a specific embodiment of the present invention. As illustrated in FIG. 12, in a step 1202, a service order is received by the server management system 201. The service order is created by the ISMS 300 in order to implement a change in configuration responsive to receiving a service order from the operator console application 120 or the customer portal application 125, for example. The service order can be in the form of a command packet, which is received by the network interface module of the server SMS 201, for example. Then, in a step 1204, the service order is analyzed and executed. In a specific embodiment, a service order processing module of the server SMS 201 analyzes the service order to determine the changes that need to be made to the Server subsystem configuration in order to implement the commands within the service order. Next, in a step 1206, the server configuration table in the Server SMS 201 is updated to reflect the new configuration. This information is also contained in the server table cache 330 of ISMS 300. Then, in a step 1208, instructions to implement the new configuration are sent out to the VLAN switch 170 through a control module within the server SMS 201, for example.

Figure 13:
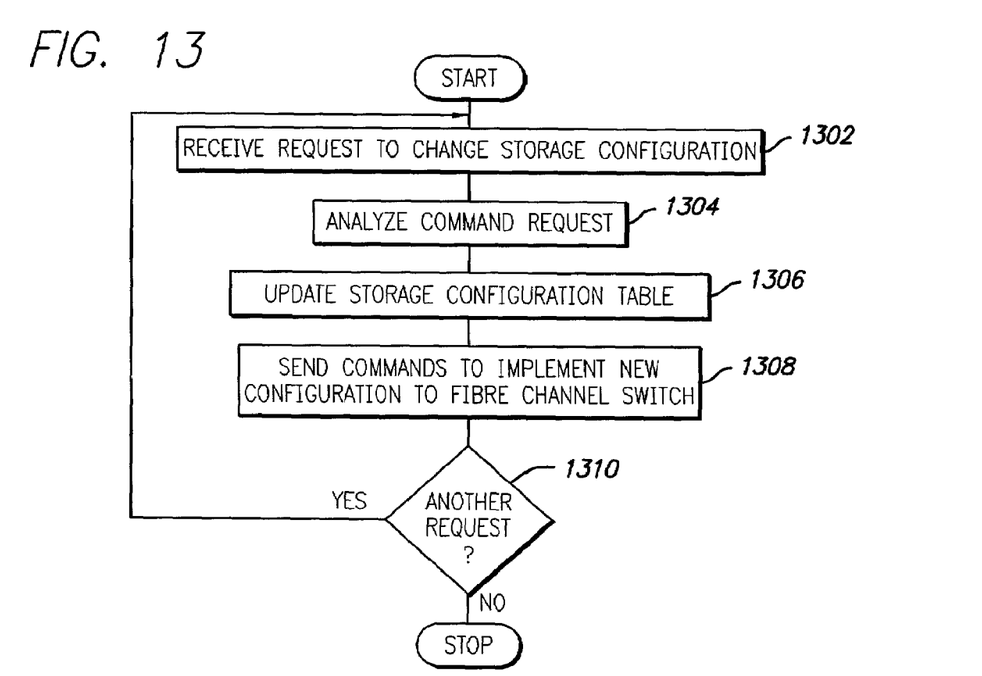
FIG. 13 shows a flowchart of representative storage management system processing in a specific embodiment of the present invention.

FIG. 13 shows a flowchart of representative storage management system processing in a specific embodiment of the present invention. As illustrated in FIG. 13, in a step 1302, a service order is received by the storage management system 202. The service order is created by the ISMS 300 in order to implement a change in configuration responsive to receiving a service order from the operator console application 120 or the customer portal application 125, for example. The service order can be in the form of a command packet, which is received by the network interface module of the storage SMS 202, for example. Then, in a step 1304, the service order is analyzed and executed. In a specific embodiment, a service order processing module of the storage SMS 202 analyzes the service order to determine the changes that need to be made to the storage subsystem configuration in order to implement the commands within the service order. Next, in a step 1306, the storage configuration table in the storage SMS 202 is updated to reflect the new configuration. This information is also contained in the storage table cache 340 of the ISMS 300. Then, in a step 1308, instructions to implement the new configuration are sent out to the FC switch 190 through a control module within the storage SMS 202, for example.

Logical Partitioning

In specific embodiments of the present invention, logical partitioning techniques may be applied to high-end application servers to provide enhanced security and access control. Some servers, especially those created for high-end market, have a capability called logical partitioning. A logical partition is a logical entity implemented on a single physical computer. It is possible to have more than one logical partition on a single physical computer. If multiple logical partitions reside on a computer, each one of the partitions is independent from the other. Each partition can contain a different operating system within it. In addition, application programs that run on a certain logical partition would not see any other applications that run on other logical partitions. Therefore, from an application's point of view, a logical partition acts as if it is a single independent computer system even though the logical partitions reside in the same physical computer.

By using logical partitioning, service providers can serve more customers with the same number of servers. This means that the service providers can save the floor space of data centers, which is becoming an increasingly scarce resource due to fast growing server needs. As each logical partition is logically separate, and there is no interaction between them, even if multiple customers share one physical server, these customers can preserve information confidentiality and avoid system crashes caused by other customers' actions.

FIG. 14 shows a representative system configuration using LPAR capability in a specific embodiment of the present invention. In the illustrated specific embodiment of the present invention, application servers in SSAS have logical partitioning capabilities. A logical partition is identified by a combination of a physical server and a logical partition ID (LPAR ID). In FIG. 14, one physical server P-1 (1400) holds three logical partitions in it: L-1 (1420), L-2 (1430) and L-3 (1440). Another physical server P-2 (1410) holds a single logical partition L-1 (1450).

Figure 15:
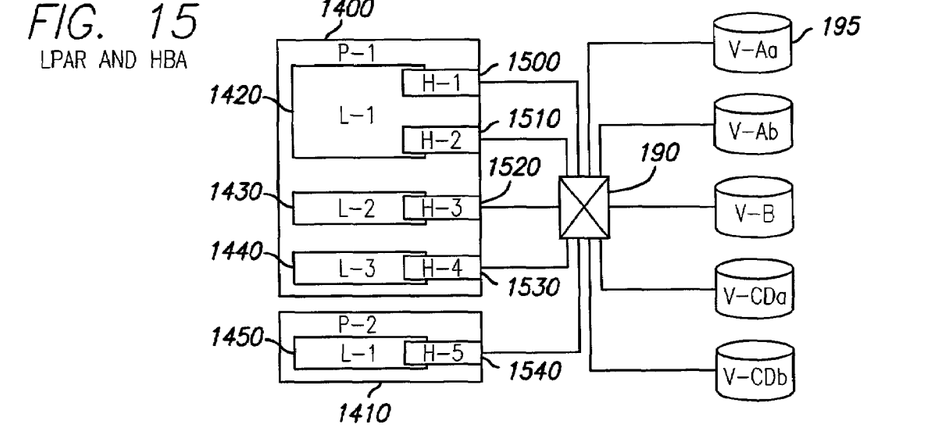
FIG. 15 shows a representative relationship between logical partitions and host bus adaptors (HBAs) in a specific embodiment of the present invention.

FIG. 15 shows a representative relationship between logical partitions and host bus adaptors (HBAs) in a specific embodiment of the present invention. A host bus adaptor (HBA) is an interface device that gives a server access to the storage area network. Because it is possible for one LPAR to have more than one HBA, server SMS 201 should be able to manage a mapping between a logical partition and one or more HBAs attached to it.

In the example shown in FIG. 15, a physical server P-1 (1400) contains three logical partitions, L-1 (1420), L-2 (1430) and L-3 (1440), while P-2 (1410) has a single logical partition, L-1 (1450). Physical server P-1 (1400) is equipped with four HBAs, H-1 (1500) through H-4 (1530). Among these four HBAs, H-1 (1500) and H-2 (1510) are associated with L-1 (1420), and H-3 (1520) and H-4 (1530) are associated with L-2 (1430) and L-3 (1440), respectively. In physical server P-2 (1410), there is only one logical partition, L-1 (1450) and one HBA, H-5 (1540). Though it is not shown in this example, it is also possible for more than one logical partition to share the same HBA.

As access security in the storage area network is controlled on a per-HBA basis, the storage management subsystem manages which HBA is allowed to access which storage volumes.

Figure 16:
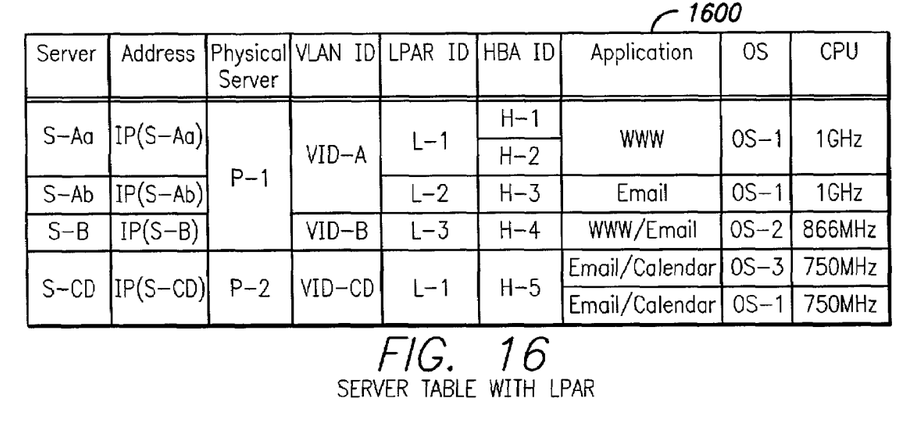
FIG. 16 shows a representative server table for managing a mapping between application servers, logical partitions and HBAs in a specific embodiment of the present invention.

FIG. 16 shows a representative server table for managing a mapping between application servers, logical partitions and HBAs in a specific embodiment of the present invention. As shown by FIG. 16, a server SMS 201 holds the server table 1600. Server table 1600 in FIG. 16 contains additional columns for storing information such as a physical server, a logical partition ID (LPAR ID) and an HBA ID.

Within server table 1600, "Server" identifies one of application servers within the server subsystem. "Address" holds the IP address of that server. "Physical Server" holds the id of the physical server in which the application server is contained. "VLAN ID" is the VLAN tag value assigned to that server. "LPAR ID" is the unique id that identifies the logical partition on which the application server runs. "HBA ID" specifies which HBA is attached to the logical partition. The actual value of HBA ID depends on the protocol used in the storage area network. For example, in the Fibre Channel based network, the world wide name of the HBA is used as an HBA ID. "Application," "OS," and "CPU" indicate the application running on the server, operating systems of the server, and CPU processing capability such as CPU speed, respectively.

Note that servers such as S-Aa, S-Ab and S-B, are logical notions of the application server. They are identified by a combination of a physical server and a logical partition in it. Thus, according to the configuration shown in FIG. 16, servers S-Aa, S-Ab and S-B are on the same physical computer P-1 (1400) and their LPAR IDs are L-1 (1420), L-2 (1430) and L-3 (1440), respectively. Server S-CD, on the other hand, is on the physical computer P-2 (1420), which holds a single logical partition L-1 (1450).

Figure 17:
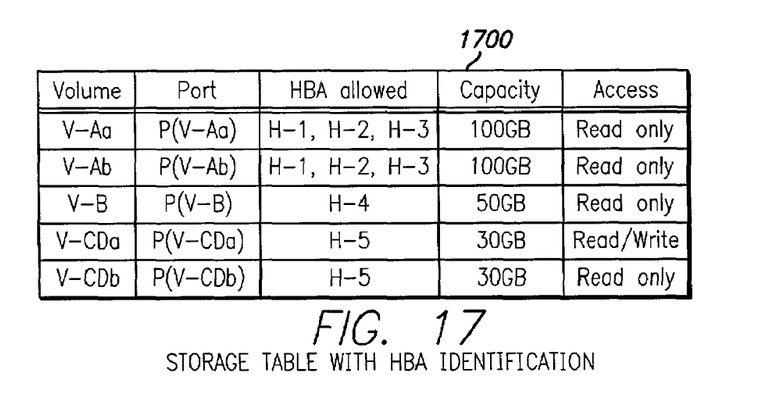
FIG. 17 shows a representative storage table useful in a specific embodiment of the present invention.

FIG. 17 shows a representative storage table useful in a specific embodiment of the present invention. The storage table 1700 can support embodiments using an LPAR configuration. It contains the configuration information that a storage management subsystem 202 uses to configure the FC switch 190 and storage volumes 195. Within storage table 1700, "Volume" identifies one of the storage volumes with in the storage subsystem. "Port" holds the FC port address of the volume. "HBA allowed" specifies those HBAs that are allowed to access this storage volume. "Capacity" and "Access" each indicates the storage volume capacity and access control attribute of the volume, respectively.

The ISMS 300 collects mapping information from server SMS 201 and storage SMS 202, and combines the mapping information into the service mapping table 800 of FIG. 8 and the service status table 900 of FIG. 9. The remaining operation is substantially similar to the processing of the specific embodiments discussed herein above with respect to FIGS. 10-13.

The preceding has been a description of the preferred embodiment of the invention. It will be appreciated that deviations and modifications can be made without departing from the scope of the invention, which is defined by the appended claims.

What is claimed is:

1. A management system for managing resources to be provided to a plurality of clients, the resources including a router, a server, and a plurality of storage volumes, the management system comprising;
   a network management system which stores network configuration information including relationship between IP address of the clients and VLAN-IDs, mad manages the router based on the network configuration information, wherein the router assigns corresponding VLAN-ID to a packet with said IP address when sending the packet from one of the clients to the server,
   a server management system which stores server configuration information including relationship between the VLAN-IDs, LPAR IDs and interface IDs to access at least one of the plurality of storage volumes, and manages the server based on the server configuration information, wherein the server has a plurality of logical partitions specified by the LPAR Ids which are associated with the interface IDs;
   a storage management system which stores storage configuration information including relationship between the interface IDs and at least one of the plurality of storage volumes to be accessed, and manages the plurality of storage volumes based on the storage configuration information wherein the plurality of storage volumes is access-controlled by using the interface IDs; and
   an integrated management system coupled communicatively to the network management system, the server management system mad the storage management system so that the integrated management system can manage the network configuration information, the server configuration information mad the storage configuration information;
   wherein the integrated management system determines configuration changes of the resources that need to be made in order to operate service with reference to the network configuration information so that the integrated management system can manage configuration of the resources on per-service basis;
   wherein the integrated management system which receives an event notification from one of the network management system, the server management system and the storage management system, determines a range affected by the event with reference to the configuration changes of the resources.

2. The management system for managing resources according to claim 1, wherein the range affected by the event indicates which client be affected by the event.

3. The management system for managing resources according to claim 1, wherein the range affected by the event indicates which application operating on the server be affected by the event.

4. The management system for managing resources according to claim 1, wherein the range affected by the event indicates which storage volume be affected by the event.

5. The management system for managing resources according to claim 1, wherein the range affected by the event indicates which network be affected by the event.

6. The management system for managing resources according to claim 1, wherein the network configuration information includes communication protocol information, the server configuration information includes OS, CPU processing capability information, and the storage configuration information includes volume capacity and access control attribute, respectively.

7. The management system for managing resources according to claim 6, wherein the integrated management system collects the network configuration information, the server configuration information and the storage configuration information from the network management system, the server management system and the storage management system.

8. The management system for managing resources according to claim 7, wherein the integrated management system sends a new configuration in order to reflect the configuration changes to at least one of the network management system, the server management system and the storage management system,
   at least one of the network management system, the server management system and the storage management system determines configuration changes of the resources for executing the new configuration with reference to the network configuration information, the server configuration information and storage configuration information respectively.

9. A management system for managing resources to be provided to a plurality of clients, the resources including a router, a server, and a plurality of storage volumes, the management system comprising;
   a network management system which stores network configuration information including relationship between IP address of the clients mad VLAN-IDs, and manages the router based on the network configuration information, wherein the router assigns corresponding VLAN-ID to a packet with said IP address when sending the packet from one of the clients to the server,
   a server management system which stores server configuration information including relationship between the VLAN-IDs, LPAR IDs and interface IDs to access at least one of the plurality of storage volumes, and manages the server based on the server configuration information, wherein the server has a plurality of logical partitions specified by the LPAR Ids which m-e associated with the interface IDs, wherein each LPAR ID uses at least one interface ID and said at least one interface ID is only associated with said each LPAR ID;
   a storage management system which stores storage configuration information including relationship between the interface IDs and at least one of the plurality of storage volumes to be accessed, and manages the plurality of storage volumes based on the storage configuration information wherein the plurality of storage volumes is access-controlled by using the interface IDs; and
   an integrated management system coupled communicatively to the network management system, the server management system and the storage management system so that the integrated management system can manage the network configuration information, the server configuration information and the storage configuration information.

10. The management system for managing resources according to claim 9, wherein the integrated management system which receives an event notification from one of the network management system, the server management system and the storage management system, determines a range affected by the event with reference to the configuration changes of the resources.

* * * * *